June 4, 1968          H. E. ROLLINS          3,386,687
METHOD OF DEPLOYING A FLEXIBLE WING VEHICLE
Filed July 1, 1966          7 Sheets-Sheet 3
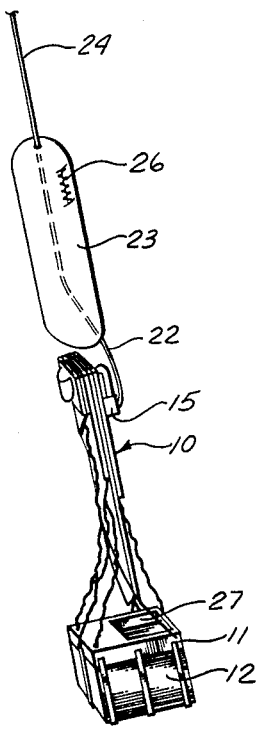
F/G. 12
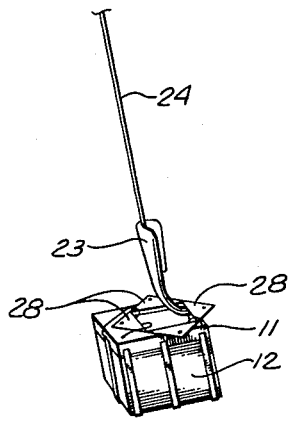
F/G. 11
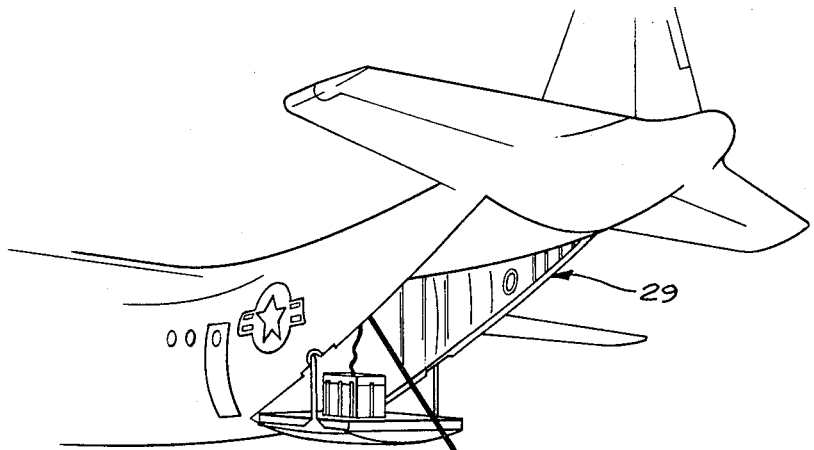
F/G. 10
INVENTOR.
HARRY E. ROLLINS
By Richard D. Seibel
ATTORNEY

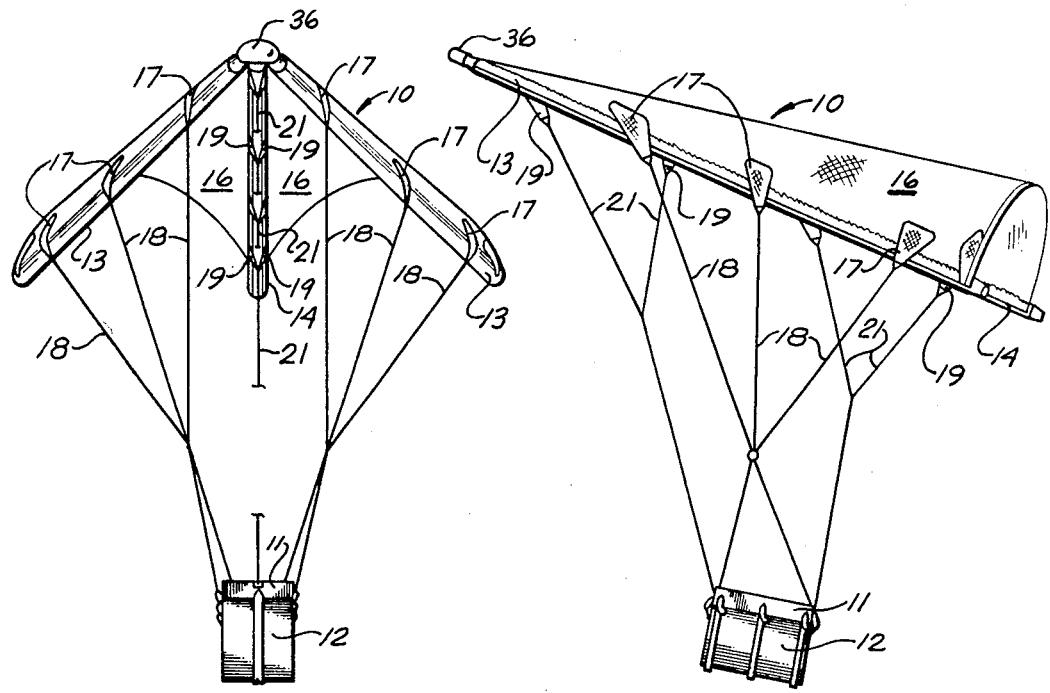

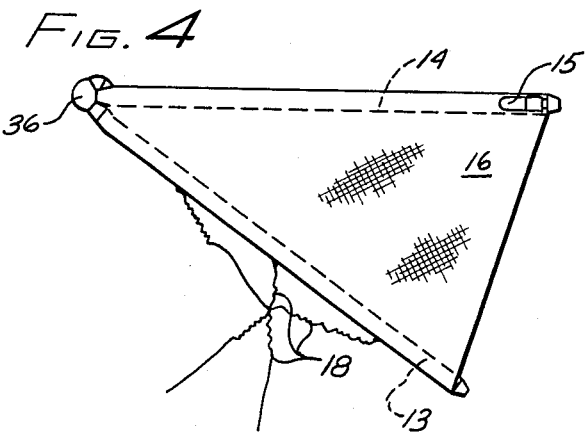
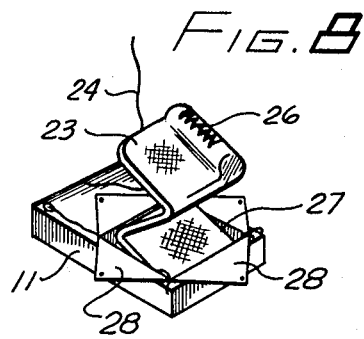
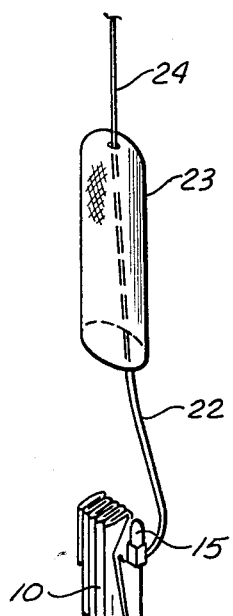
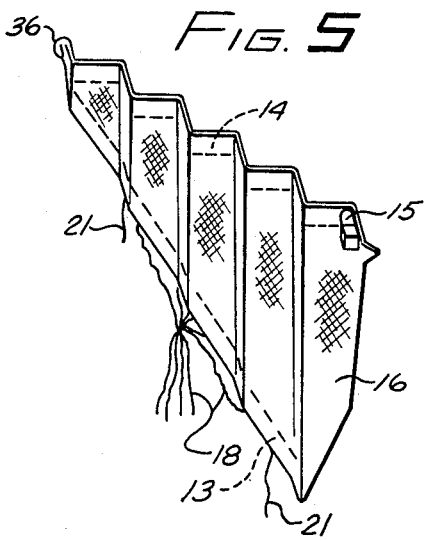
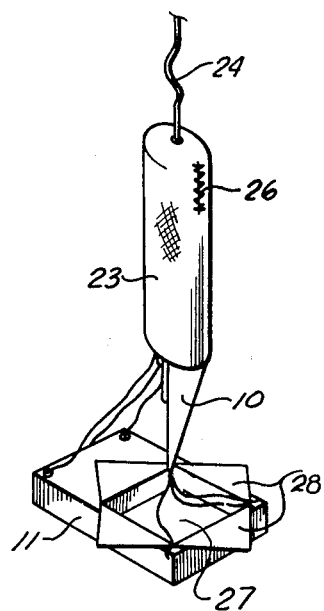
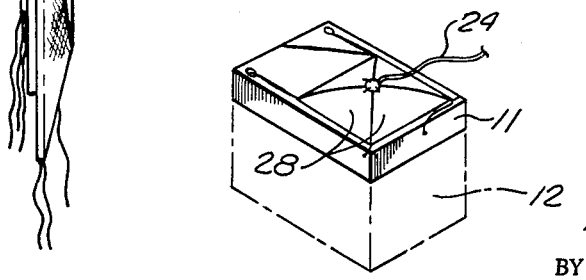

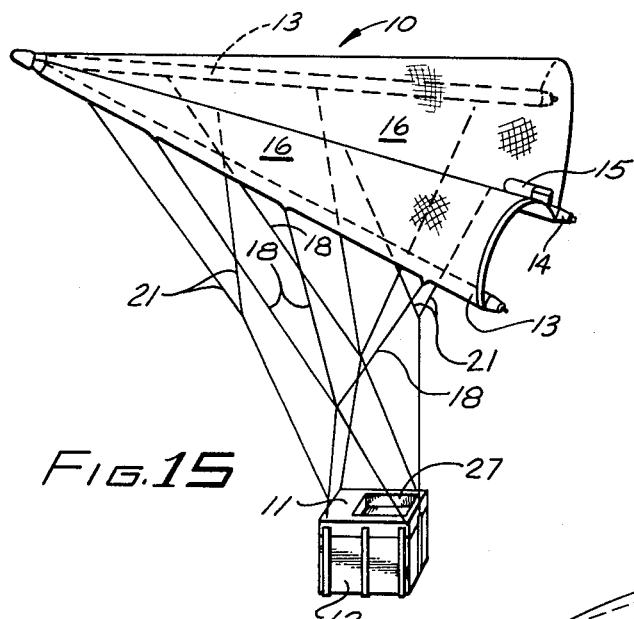
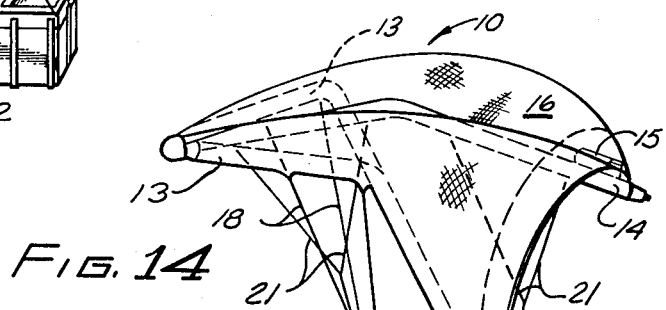
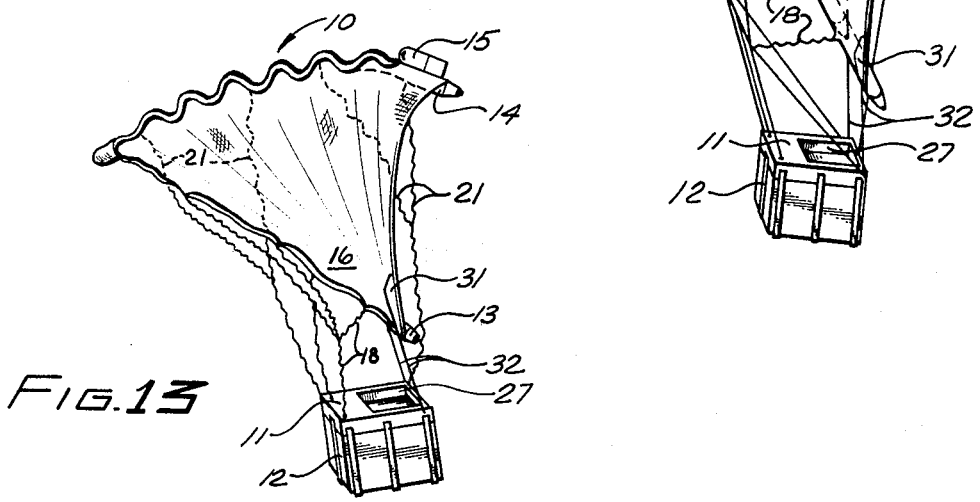

June 4, 1968  H. E. ROLLINS  3,386,687
METHOD OF DEPLOYING A FLEXIBLE WING VEHICLE
Filed July 1, 1966  7 Sheets-Sheet 5
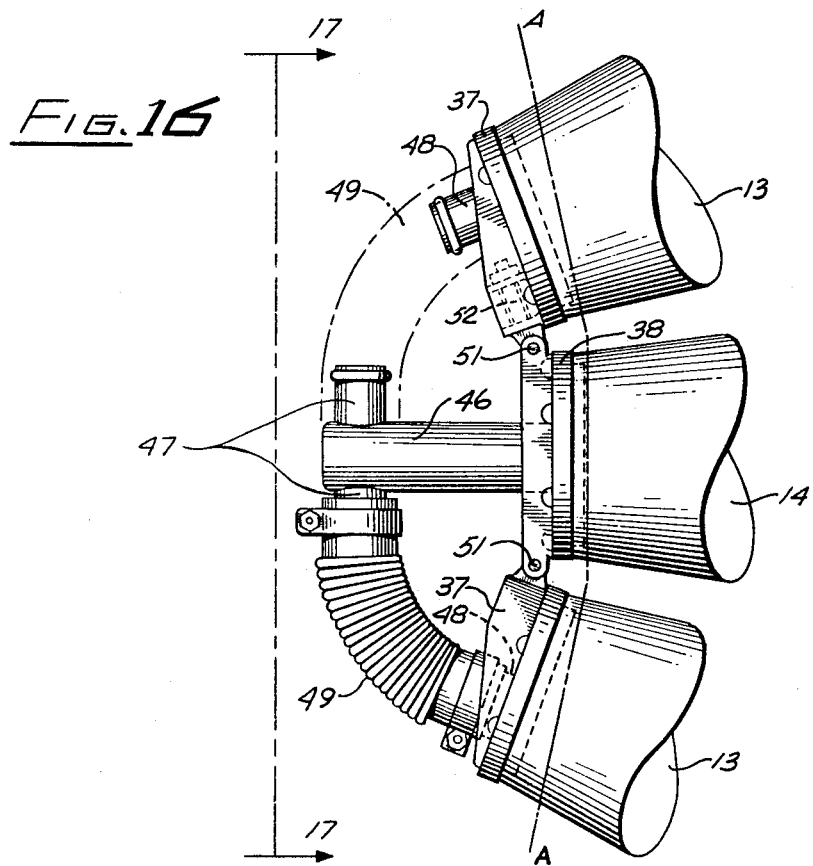
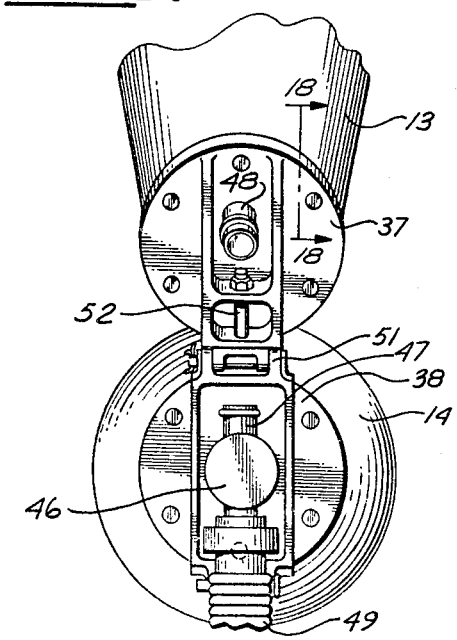
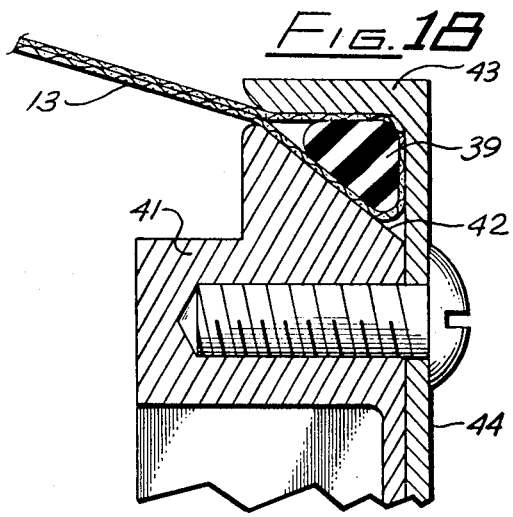
INVENTOR.
HARRY E. ROLLINS
BY Richard D. Seibel
ATTORNEY

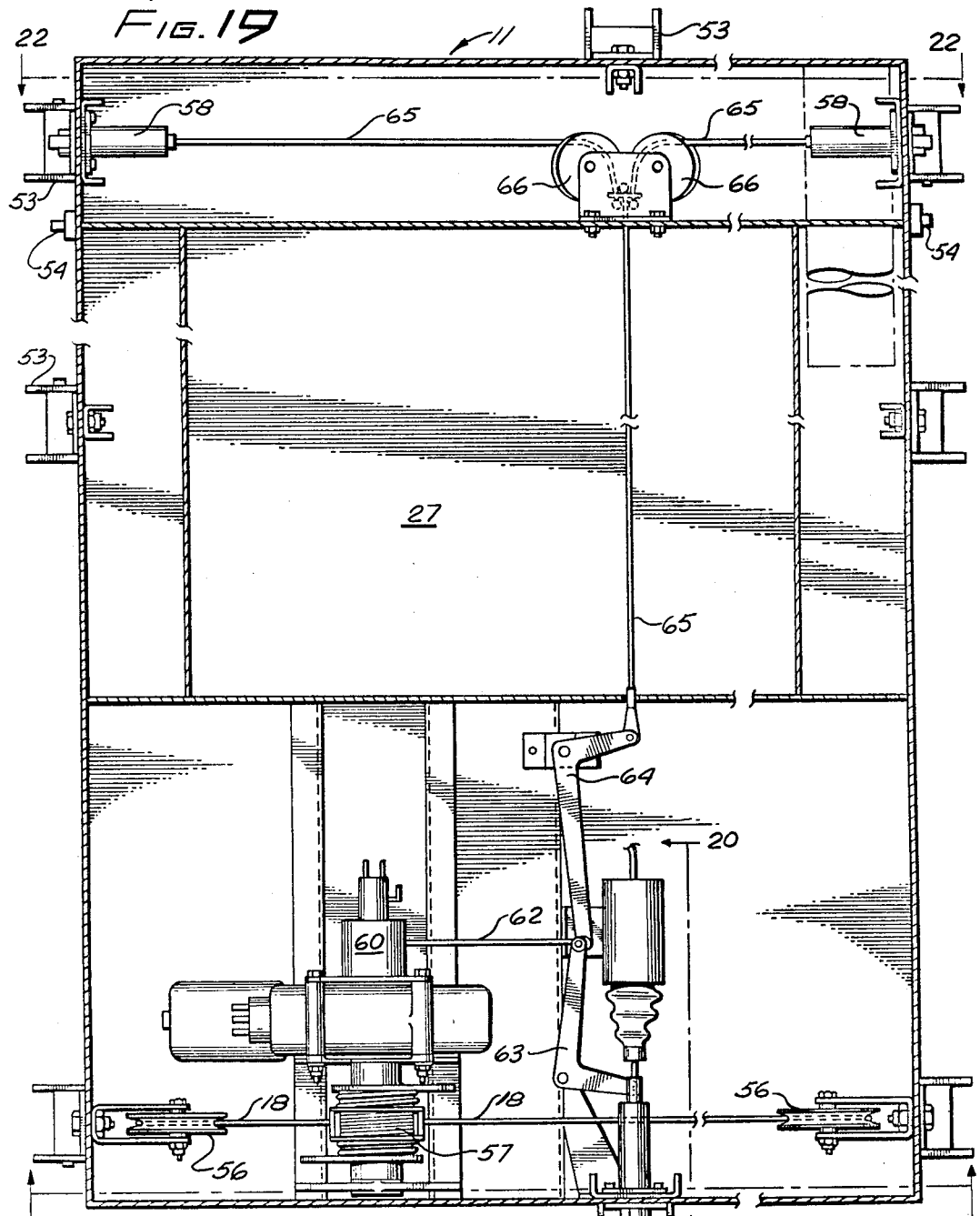

June 4, 1968
H. E. ROLLINS
3,386,687
METHOD OF DEPLOYING A FLEXIBLE WING VEHICLE
Filed July 1, 1966
7 Sheets-Sheet 7
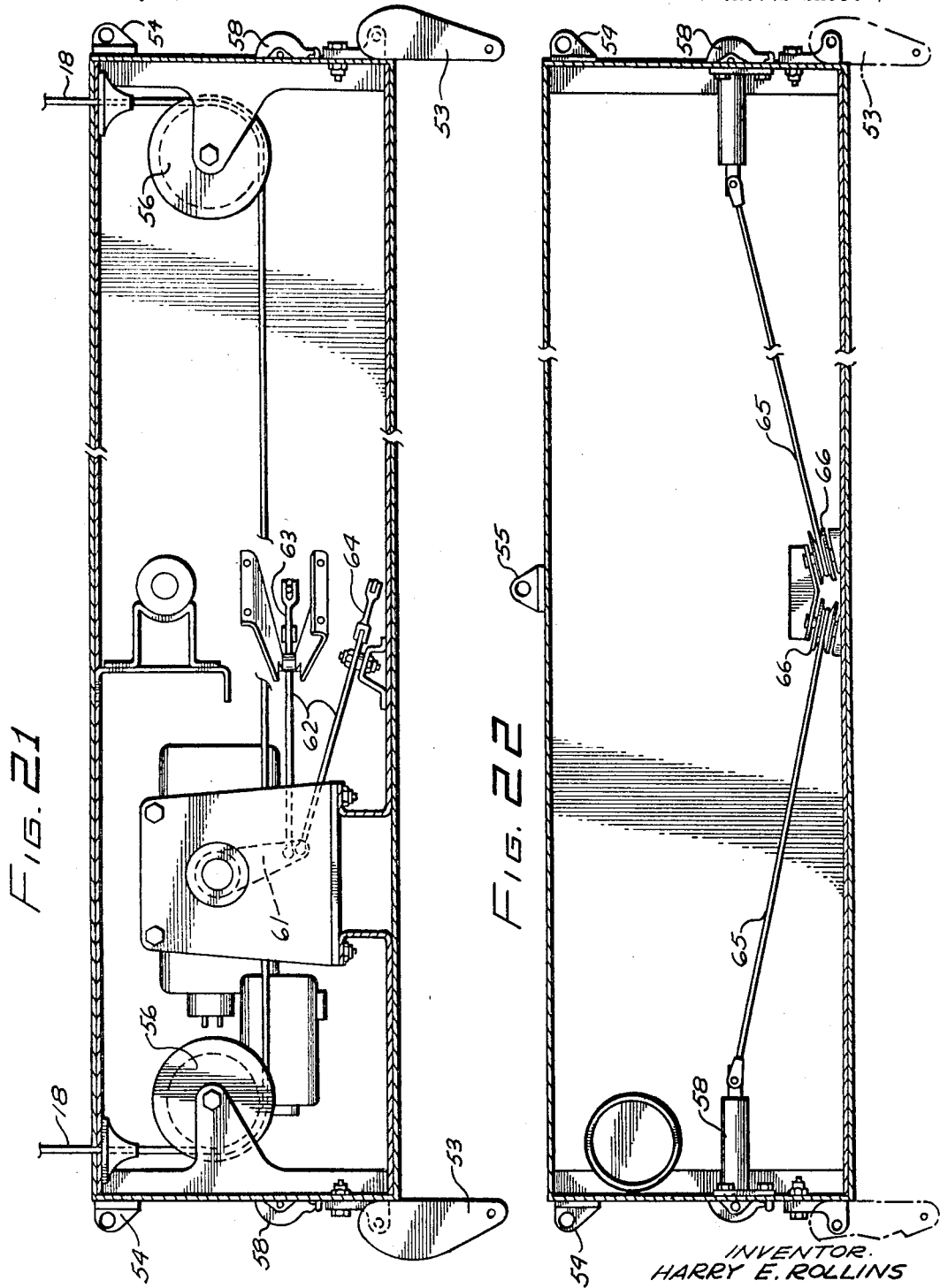
INVENTOR.
HARRY E. ROLLINS
BY Richard D. Seibel
ATTORNEY United States Patent Office 3,386,687
Patented June 4, 1968

3,386,687
METHOD OF DEPLOYING A FLEXIBLE
WING VEHICLE
Harry E. Rollins, Fullerton, Calif., assignor to North American Rockwell Corporation, a corporation of Delaware
Filed July 1, 1966, Ser. No. 562,226
19 Claims. (Cl. 244—49)

ABSTRACT OF THE DISCLOSURE

Deployment of a flexible wing gliding vehicle comprising three inflatable flexible booms forming a rigidifiable trifurcated frame and a fabric sail between the booms is described. Initially the sail and deflated booms are stored in a compartment in a payload. During the steps of deployment the wing is withdrawn from the compartment, and, while the wing is unfolding, the booms are inflated with the central boom inflating before the side booms. The ends of the two booms are reefed to the payload until all the booms are completely inflated to provide a transient bonnet-like shape of generally M-shaped transverse cross section.

After full inflation the reefing is released, permitting the booms to straighten quickly into a fully deployed position. A gas manifold at the leading end apex where the three booms are connected and a gas source on the center boom provide the sequential inflation of the booms.

---

This invention relates to improvements for a flexible wing vehicle having a trifurcated rigidifiable frame and in particular relates to improved packing and deployment of a flexible wing.

In recent years considerable interest has been shown in flexible wing vehicles or gliders for providing gliding flight in the atmosphere. Such vehicles are employed for landing payloads from an aircraft, for example, at a selected site by controlling the glide path of the vehicle to the site. The angle of attack of such a vehicle is controlled for control of the flight range and the aerodynamic characteristics of the vehicle are modified in flight to provide steering. One difficulty encountered with such a vehicle is in deployment of the flexible wing from a falling payload and inflation of rigidifiable portions of the wing to shape the wing to a gliding configuration. For successful operations the deployment must be highly reliable and involve minimal opening forces.

Prior art gliding vehicles have been deployed initially in the form of a parachute to initially partially arrest free fall of the payload. Such an arrangement as illustrated in U.S. Patent 3,141,640 has rigidifiable booms that are subsequently inflated to shape the flexible wing into a gliding configuration. Such a deployment sequence involves high shock loads when the parachute canopy inflates and since the riser lines are arranged in one or two bundles, tangling can readily occur during deployment. Such an arrangement also involves a large number of riser lines and requires several separated dereefing mechanisms that must all be activated simultaneously for proper deployment.

It is therefore a broad object of this invention to provide a reliable deployment technique for a flexible aerodynamic vehicle.

Thus in the practice of this inventon according to a preferred embodiment there is provided an inflatable trifurcated frame having a flexible sail secured to the branches thereof to form an aerodynamic body or wing. A central keel boom and two leading edge booms joined thereto at a leading apex of the wing and diverging toward the aft end of the wing form the crowfoot shaped frame.

A payload is suspended from the aerodynamic wing by a plurality of riser lines secured therebetween. Before deployment of the aerodynamic vehicle, the flexible wing is folded and packed within a portion of the payload. The wing is folded along the keel boom so that the two leading edge booms are contiguous along their length, and then a series of an accordion folds are made in the entire wing normal to the keel boom. The folded wing is contained in a flexible deployment bag and the entire assembly is accordion folded into a compartment in the payload.

When the wing is used, a static line pulls the flexible wing from the payload, strips off the deployment bag that surrounds the wing and simultaneously initiates inflation of the frame. Inflation of the central keel boom in the frame occurs first and unfolds the wing in an orderly manner that minimizes opening loads and prevents tangling of riser lines. Aerodynamic forces have been used in the prior art for unfolding of flexible wings. The two leading edge booms of the trifurcated frame are inflated at a somewhat slower rate than the keel boom. In a preferred embodiment the pressurization system feeds gas directly into the keel boom and a flow limiting gas manifold connecting to the leading edge booms is at the apex. The keel boom inflates to a substantially rigid condition and, since the riser lines between the keel boom and the payload are nearly fully extended, the keel boom becomes substantially straight. The aft ends of the two leading edge booms are reefed to the payload by relatively short reefing lines so that the wing assumes a bonnet shape with only the keel and the aft ends of the leading edge booms held to the payload by fully tensioned riser lines.

After full pressure is attained in the leading edge booms, the reefing lines at the aft ends of the leading edge booms are released thereby permitting the leading edge booms to pop into a substantially straight configuration and the wing is then in a condition for gliding flight. Throughout deployment to this stage the payload is supported only by riser lines attached along the keel boom and from the reefing lines at the aft end of the leading edge booms. There is no load on the riser lines along the leading edge booms.

Thus it is a broad object of this invention to provide an improved aerodynamic vehicle.

It is another object of this invention to provide improved packing for an aerodynamic vehicle.

It is a further object of this invention to provide improved deployment for an inflatable vehicle.

Other objects and many of the attendant advantages of this invention will be readily appreciated as the same becomes better understood by reference to the following detailed description when considered in connection with the accompanying drawings wherein:

FIG. 1 illustrates a side view of a vehicle constructed according to the principles of this invention;
FIG. 2 illustrates a front view of the vehicle of FIG. 1;
FIG. 3 illustrates a top view of the vehicle of FIG. 1;
FIG. 4 illustrates the flexible wing of the vehicle of FIG. 1 as initially folded for packing;
FIG. 5 illustrates the folded wing of FIG. 4 accordion pleated;
FIG. 6 illustrates the wing of FIG. 4 fully folded;
FIG. 7 illustrates the wing of FIG. 4 enveloped in a deployment bag for packing in the payload;
FIG. 8 illustrates the wing of FIG. 4 partly packed into the payload;
FIG. 9 illustrates a fully packaged flexible wing;
FIG. 10 illustrates a payload ejected from an aircraft;
FIG. 11 illustrates partial extraction of the flexible wing from the payload;

FIG. 12 illustrates the flexible wing extracted from the payload;

FIG. 13 illustrates the aerodynamic body with the wing partially inflated;

FIG. 14 illustrates the flexible wing having fully inflated booms and in a reefed condition;

FIG. 15 illustrates the fully deployed wing in a gliding configuration;

FIG. 16 illustrates an apex connection for the vehicle of FIG. 1;

FIG. 17 is a partial front view of the apex connection of FIG. 16;

FIG. 18 illustrates a partial cross-section of a connection between a flexible boom and a rigid end fitting;

FIG. 19 illustrates a top cross section of a payload supporting platform;

FIG. 20 is a partial cross section of the payload supporting platform;

FIG. 21 is a front cross section of the payload supporting platform; and

FIG. 22 is an aft cross section of the payload supporting platform.

Throughout the drawings like numerals refer to like parts.

Additional details and the structure of the flexible wing vehicle itself are described and claimed in copending U.S. patent application Ser. No. 562,139, by A. F. Cummings, A. B. Miller, W. T. Neal and H. E. Rollins, entitled "Flexible Wing Vehicle," and assigned to North American Rockwell Corporation, the assignee of this invention.

FIG. 1 illustrates an aerodynamic vehicle to which the principles of this invention may be applied. The structure of such a vehicle is described initially to aid in an understanding of the deployment method employed. As illustrated in this embodiment there is provided a flexible wing or glider 10 from which is suspended a control platform 11 which serves to support a payload 12 by conventional means such as straps. The control platform 11 also houses the flexible wing 10 before deployment as hereinafter described. The flexible wing 10 comprises a trifurcated inflatable frame in a general crowfoot shape having two leading edge booms 13 and a keel boom 14 therebetween. The two leading edge booms 13 and the keel boom 14 are attached together at an apex at the leading end of the aerodynamic body 10 and diverge toward the trailing end. A fabric sail 16 is secured between each of the leading edge booms 13 and the keel boom 14 to provide a lifting surface. During gliding flight the booms 13 and 14 comprising the trifurcated frame are inflated to a sufficient pressure to remain rigid under aerodynamic loads encountered during gliding flight. A conventional stored gas inflation system 15 or gas generator is located on top of the keel boom 14 at the aft end thereof for inflating the booms. Under aerodynamic loading the sail 16 forms high lobes between the rigid booms and supports the vehicle in the atmosphere. By trimming the wing 10 to have a positive angle of attack, a good lift over drag ratio is obtained for prolonged gliding flight and gentle landing of payloads.

A plurality of leading edge gussets or splice sheets 17 are secured to the sail 16 adjacent the leading edge booms 13 and a plurality of leading edge riser lines are secured between the gussets 17 and the control platform 11. Keel gussets or splice sheets 19 are secured to the sail at substantially equal spacings, adjacent the central or keel boom 14 of the aerodynamic body. A plurality of keel riser lines 21 extend between the keel gussets 19 and the control platform 11. The riser lines 18 and 21 support the control platform 11 and payload 12 from the aerodynamic body 10 during gliding flight.

In a preferred embodiment the keel boom 14 is connected to the two leading edge booms 13 at the forward end of the vehicle by an interconnection including a gas manifold. FIGS. 16 and 17 illustrate an apex connection wherein the apex protective cover 36 shown in FIGS. 1–3 has been removed for purposes of illustration. A line A—A in FIG. 16 indicates the rearward extent of the protective cover 36 which is preferably formed of plastic in a smooth aerodynamic shape and secured to the wing by lacing or the like (not shown). Each of the leading edge booms 13 terminates in a rigid lateral end closure 37 and the keel boom 14 terminates in a rigid central end closure 38. The rigid end closures 37 and 38 are each secured to the flexible booms 13 and 14 respectively as is shown in more detail in FIG. 18 which illustrates in partial cross-section a typical interconnection between a leading edge boom 13 and a lateral end closure 37.

As illustrated in FIG. 18 the end of the inflatable boom 13 has a peripheral enlargement at the end thereof which comprises a rubber O-ring 39 having a portion of the fabric of the boom wrapped therearound and cemented or stitched to itself to enclose the O-ring. A rigid plate 41 is fitted within the flexible boom and has an external diameter larger than the O-ring 39 to provide a relatively close fit within the inside of the flexible boom near the O-ring for good sealing. A chamfer 42 is provided on the metal plate 41 around the periphery thereof. The chamfer in a preferred embodiment extends between the outer diameter of the plate and one face thereof at about a 45 degree angle and serves as a sealing seat for the peripheral enlargement on the end of the boom.

A rigid ring 43 is fitted over the external diameter of the metal plate 41 and has an inwardly extending flange 44 on one side thereof. The flange 44 is secured to the rigid plate so that the flange 44, the ring 43, and the chamfer 42 on the plate 41 cooperate to define a peripheral enclosure therebetween. The enclosure has a substantially triangular cross-section that deforms the O-ring 39 against the chamfer to provide a seal and prevent gas leakage from the boom.

In order to obtain orderly deployment it is preferred to unfold a packed wing by inflating the keel boom and subsequently inflating the leading edge booms. Several inflation modes are possible involving different times for commencing inflation, slower rates of inflation of leading edge booms, and the same or different times of completion of inflation of the leading edge and keel booms. Obviously many permutations of these variables can be involved.

In a preferred embodiment, gas is admitted to the aft end of the keel boom at a selected rate which serves to unfold the keel boom. After the keel boom inflation has progressed forward much, if not all, of the way to the apex, gas commences to flow into the leading edge booms by way of a flow limiting pneumatic connection. Because of the limited flow, the keel boom is fully inflated before the leading edge booms are fully inflated.

Any of a variety of pneumatic arrangements may be employed for sequential inflation of the booms, however, in a preferred embodiment a simple and reliable gas manifold at the apex is preferred. Thus, referring again to FIGS. 16 and 17, the central end closure 38 has an axial tube 46 extending therefrom with a T-connection 47 at the opposite end thereof. The tube 46 communicates with the interior of the keel boom 14 and is conveniently secured to and through a plate 41 rather than a flange 44 on the end closure. The internal diameter of the tube 46 is sized so as to give a selected flow rate of gas therethrough to control the relative inflation rates of the keel boom and leading edge booms. A preselected constant diameter tube 46 is preferred because of the simplicity, however it will be apparent to one skilled in the art that other types of pneumatic metering devices such as restrictive orifices could be employed in conjunction with the tube 46.

The two lateral end closures 37 each have a tube 48 extending from the plate through the flange of the end closure and communicating with the interior of the leading edge booms 13. The tubes 48 are preferably displaced from the axis of the leading edge booms to allow space for mechanical interconnection between the booms. A flexible tube 49 interconnects each of the tubes 48 on the lateral end closures with the T-connection 47 on the central end closure to form a gas manifold. Thus the interior of the keel boom 14 is in gas communication with the interior of each of the leading edge booms 13. Since the tube 46 has a limited inside diameter, the gas manifold serves to limit the flow of gas between the keel boom and the leading edge booms.

It will be apparent that other inflation means can be employed for controlled times and rates of boom inflation. Thus, for example, separate pressurization systems can be used for the keel boom and leading edge booms respectively. The two systems can be sequentially actuated as well as having different flow rates in order to inflate the keel boom in advance of the leading edge booms. Similarly a single pressurization source can be employed along with sequential valving to the keel and leading edge booms.

The lateral end closures 37 are each joined to the central end closure 38 so that the booms 13 and 14 are interconnected at the leading apex of the wing. In a preferred embodiment a hinge 51 is provided between the keel boom and each leading edge boom so that the booms can move laterally relative to each other. A second hinge 52 is provided normal to the hinge 51 so that the booms can rise and fall relative to each other during flight. Additional details of the mechanical interconnection between the leading edge booms and the keel boom are described and claimed in U.S. patent application Ser. No. 562,138, entitled "Improvements for a Flexible Wing Vehicle Apex," by Harry E. Rollins and assigned to North American Rockwell Corporation, the assignee of this invention.

A payload supporting platform 11 providing control mechanisms for a flexible wing vehicle is illustrated in FIGS. 19–22. The platform contains the folded wing and has reefing arrangements employed in the deployment method hereinafter described. FIG. 19 is a top cross-sectional view of a typical platform found useful in the practice of this invention. Arranged around the sides of the platform 11 are a plurality of conventional buckles 53 which are conveniently employed for strapping a payload to the platform. Near the aft corners of the platform eyelets 54 (FIG. 22) are provided for fastening leading edge riser lines 18 that are attached to the leading edges of the flexible wing. A centrally located eyelet 55 (FIG. 22) on the top of the platform is used for attaching the aft keel riser line 21. In FIGS. 19–22 various cable attach points are described and illustrated; however, the cables or lines themselves are not shown in these figures. It will be understood that connection to the cable attach points is by conventional means such as a loop in the end of the cable or a ring secured to the cable and that the lines are those illustrated in FIGS. 1–3.

The aft leading edge riser lines 18 are of fixed length secured to the eyelets 54 and the forward leading edge riser lines 18 are of variable length for roll control of the vehicle. The forward leading edge riser lines 18 are brought through the top of the control platform and over pulleys 56 to a winch 57. Control of the winch extends and retracts the two forward leading edge riser lines 18 respectively for roll control of the wing as is described in greater detail in the aforementioned patent application Ser. No. 562,139, entitled "Flexible Wing Vehicle."

During deployment of a flexible wing from the payload supporting platform various riser lines are reefed to the platform temporarily to provide a stable geometry after extraction of the wing from the platform and until a fully inflated gliding configuration is achieved. Thus short boom reefing lines 32, hereinafter described in relation to FIGS. 13 and 14, are attached to the control platform by means of latches 58 adjacent the aft corners of the control platform. Similarly the forward keel riser line 21 is temporarily reefed to the control platform by a latch 59 (hidden in FIG. 19). The latches 58 and 59 can be conventional cable holding devices or are preferably release mechanisms such as described and claimed in copending U.S. patent application Ser. No. 562,213, entitled "Cable Control," by Donald M. Nelson, and assigned to North American Rockwell Corporation, the assignee of this invention. The latches 58 and 59 are typically operated by a pulling motion on the axis of the latch.

In one step of the deployment method hereinafter described the flexible wing is dereefed from the platform. The dereefing of the attached lines is initiated by a dereefing actuator 60 having an arm 61 (FIG. 21) extending therefrom. Two control rods 62 are secured to the arm 61 so as to move in concert with the arm. One of the rods 62 is connected to one arm of a bellcrank 63 that has the other arm connected to the latch 59. The other of the rods 62 is connected to one arm of a bellcrank 64 that has a cable 65 attached to the other arm. The cable 65 is split into two legs, each of which passes over one of a pair of pulleys 66 and thence to one of the latches 58.

Upon initiation of dereefing by the dereefing actuator 60 which can be controlled by a conventional timer or by radioed command, the arm 61 pivots so as to pull on the rods 62. The rods operate the bellcranks 63 and 64 which pull on the latches 59 and 58 respectively either directly or by way of the cable 65. This actuates the latches 59 and 58 and simultaneously releases the respective cables held thereby. The dereefing latches are mechanically interconnected and actuated by a common device so that simultaneous action occurs during deployment for high reliability.

In order to pack the wing into the control platform the booms are deflated and the wing carefully folded for orderly deployment according to the principles of this invention as hereinafter described. As illustrated in FIG. 4 the wing is folded substantially in half along the keel boom 14 so that the two leading edge booms 13 are together and the sail is flat and smooth. The suspension lines 18 and 21 are loop braided in the conventional manner to shorten the lines to minimize the possibility of tangling, yet provide a progressive lengthening during deployment. The keel riser lines 21 are between the two halves of the sail and are thereby kept apart to prevent tangling. It is preferred to disconnect the riser lines from the control platform during the initial stages of packing for ease of handling.

After the wing has been folded in half as illustrated in FIG. 4 a series of accordion pleats (FIG. 5) is formed along the length of the wing, that is, the folds in the booms and sail are made on lines normal to the keel boom 14. The keel riser lines are within those folds to prevent tangling. The accordion pleats are folded tightly together as is more clearly illustrated in FIG. 6 and the portion of the wing having the pressurization system 15 attached thereto is folded over so that the longitudinal extent of the pressurization system lies normal to the principal portion of the keel boom. An inflation lanyard 22 is attached to the pressurization system so that a pull on the inflation lanyard will open a valve (not shown) and initiate inflation of the booms.

The inflation lanyard is secured to fabric deployement bag 23 which is in the general form of an open ended cylinder. The deployment bag 23 is in turn connected to a static line 24 which can be secured to an aircraft as hereinafter described or to a drogue or pilot parachute (not shown). A laced access opening 26 is provided in one side of the deployment bag 23 for providing ready access to the pressurization system 15 after the wing is completely packed in the control platform. The deployment bag is placed over the accordion folded wing as illustrated in FIG. 7 and the riser lines are then secured to the appropriate points on the control platform 11. Conventional keying techniques or mated connectors are employed so that the riser lines are connected to the proper points on the control platform.

A packing cavity 27 is provided in the upper surface of the control platform 11. The flexible wing in the deployment bag 23 is accordion folded within the cavity 27 in the control platform in a manner as illustrated in FIG. 8. The access opening 26 in the deployment bag is preferably arranged adjacent the open portion of the cavity so that access is available to the pressurization system even after the wing is fully packed. After the flexible wing is fully folded into the cavity 27, four fabric cover flaps 28 are folded over the enclosed wing and if desired are secured in place by a conventional adhesive tape or light frangible lacing (not shown). The static line 24 is left extending from the packed control platform for ready attachment to an aircraft or the like. The control platform is at this point ready for flight and for attachment to a payload 12.

Deployment of the flexible wing commences, for example, by ejection of the payload and control platform 11 from a conventional aircraft 29. The static line 24 is attached to the aircraft in a conventional manner so that the cover flaps 28 are pulled open and the deployment bag and wing assembly are withdrawn from the control platform in an orderly manner as illustrated in FIG. 11. When the flexible wing 10 is fully windrawn from the cavity 27 in the control platform, the deployment bag 23 is pulled off of the wing by the static line as illustrated in FIG. 12. The withdrawl of the deployment bag also pulls on the inflation lanyard 22 which is connected to the pressurization system 15 on the aft end of the keel boom so as to commence inflation of the booms on the flexible wing.

The inflation of the keel boom from the aft end thereof acts to unfold the transverse accordion folds in the wing beginning with the pleats nearest the aft end and progressing forward. This is an orderly process that substantially reverses the folding operation described and illustrated in FIG. 5. Gas for inflation of the leading edge booms passes through the keel boom from the pressurization system on the aft end thereof, to the forward apex of the vehicle, and through the above described gas manifold. Because of the flow limiting characteristics of the folded keel boom and the gas manifold the keel boom is inflated to substantial rigidity before the leading edge booms are inflated. In a typical vehicle the gas flow from the pressurization system is sufficiently high that the keel boom is inflated to substantial rigidity in approximately seven seconds with a pressure of approximately seven p.s.i. An additional four seconds, for a total of eleven seconds, is required to inflate the leading edge booms to rigidity and raise the pressure in the total boom system to about 15 p.s.i. Thus the keel boom is inflated to form a substantially straight shape before the leading edge booms are inflated to any appreciable extent.

The inflation of the keel boom occurs during the time when the wing is being snatched from the payload in the stage of deployment illustrated in FIG. 13 and continues after the riser lines are as fully extended as they can be in the reefed condition. During this stage of deployment, the aft ends of the leading edge booms 13 and the forward end of the keel boom 14 are reefed to the control platform 11 and all other lines are free to subsequently extend to their full length when loaded. The relative line lengths are such that the leading edge risers are nearly, but not quite fully extended during reefed inflation.

Boom reefing gussets 31 are attached to the sail 16 adjacent the aft ends of the leading edge booms 13. A short boom reefing line 32 is secured to each of the reefing gussets 31 and at the opposite end to the control platform 11 at aft corners thereof. As the keel boom inflates and unfolds from the aft end, air is scooped by the aft end of the sail, the corners of which are held apart by the boom reefing lines 32. This air fills the sail from the aft end concurrently with inflation of the keel boom and spreads the leading edge booms laterally from the keel boom. Since the scoop formed by the aft edge of the sail is relatively small and some air escapes from the other edges of the sail, the filling of the sail is relatively slow as compared with parachute inflation and no sudden shock loads are generated.

The forward keel riser line 21 is reefed during inflation of the booms so as to be about 12 to 18 inches shorter than the extended length employed in normal gliding flight. By reefing the aft ends of the leading edge booms and the forward keel riser, the wing is forced into a bonnet-like shape of generally M shaped transverse cross-section as illustrated in FIG. 14 due to the stiffness of the booms after inflation and aerodynamic loading on the sail. The forward keel riser is reefed to hold the leading end apex of the wing downward in the bonnet shape to reduce the quantity of air flowing underneath the wing from the aft end forward. The curve formed in the wing by this reefing moves the center of pressure forward and gives a sable aerodynamic configuration to the vehicle. Reefing of the forward keel riser prevents the wing from moving aft relative to the payload and collapsing. With the wing in the bonnet shape illustrated in FIG. 14, some forward motion of the vehicle occurs, however, the principal motion is still downward.

The snatch and sail filling forces are accommodated by the keel riser lines 21 and the aft reefing lines 32. The leading edge riser lines 18 between the payload supporting member 11 and the leading edge booms are all slack up to and during the stage of deployment illustrated in FIG. 14. The support of the payload by means of the keel riser lines and the short reefing lines 32 permits orderly deployment of the wing in the longitudinal direction under control of the forces of the inflating booms rather than aerodynamic flow due to falling. This minimizes the possibility of riser lines tangling and substantially reduces the shock forces upon deployment.

When a flexible fabric wing is employed in a parachute like manner by reefing peripheral riser lines on the leading edge booms as has been done in the prior art, a substantial and sudden opening force is encountered when the parachute canopy inflates, and riser lines and their connections must be designed to accommodate the high forces. In a deployment technique as described herein, the opening is gradual due to inflation of the booms over several seconds and no heavy shock loads are encountered. During inflation of the leading edge booms the sail on the wing also "inflates" due to aerodynamic forces. This also occurs relatively gradually during gradual stiffening of the leading edge booms and no heavy shock loads are generated.

After the pressure in the booms is at the operating pressure for gliding flight, which is about twice the pressure at which buckling of a boom might occur during normal flight loads, the short boom reefing lines 32 are released or severed by conventional dereefing mechanisms, and the forward keel riser lines are extended to full length by dereefing. A useful dereefing structure has been described in relation to FIGS. 19–22. This permits the leading edge booms to pop outward and upward into a substantially straight shape under a combination of the aerodynamic loading and the inherent stiffness of the inflated booms. The momentary release of the loads on the aft ends of the leading edge booms permits straightening during deployment with pressures no higher than required for normal gliding flight. The only substantial additional force in this stage of deployment is on the aft leading edge riser lines and this is not an extraordinary force and is readily accommodated. After popping into a substantially straight shape the booms are in a configuration substantially as shown in FIG. 15 with the sail forming high lobes between the rigid booms. In this condition the vehicle is trimmed for gliding flight and performs in a reliable and highly desirable manner.

The unfolding of the keel boom and subsequent inflation of the leading edge booms are orderly and the total vehicle is stable during deployment and in flight after complete boom inflation. The transition between the condition where the booms are inflated and reefed to the payload and the condition where the booms are inflated and in the gliding mode, is smooth and rapid with no flight instabilities noted. Numerous flights have been made employing a deployment sequence substantially as shown and illustrated and in no instances have any flight instabilities been noted in any portions of the deployment sequence.

A reason for the stability of the deployment is that at all times after initial snatching of the wing from the payload through inflation of the booms, all of the keel riser lines are in tension and separated by the inflating keel boom. The leading edge risers are concomitantly separated longitudinally by inflation forces and laterally by aerodynamic forces. Since deployment is controlled by boom inflation rates and not aerodynamic forces, there is no alternative deployment mode that can interfere with orderly deployment. The vehicle is in a stable condition during boom inflation and upon release of the reefing lines 32, the leading edge booms pop into gliding configuration without releasing the tension on any of the previously loaded riser lines. Tension is applied in a short time to the forward leading edge risers and the only slack lines are the aft leading edge risers. This is of considerable importance in minimizing the possibility of tangling riser lines and avoiding improper folds in the wing upon deployment. The only time during the deployment sequence when the keel riser lines are slack is during initial deployment of the wing from the control platform in the phase illustrated in FIG. 13. During such deployment the reefing lines 32 between the aft ends of the leading edge booms and the control platform become taut and accommodate a substantial amount of the snatch force of the inflating sail.

The flexible wing vehicle described and illustrated is not called upon to respond in the manner of a conventional parachute with attendant high shock loads and the total number of riser lines can be reduced to the number required for gliding flight. If it is desired to operate a flexible wing vehicle in an uninflated condition as a conventional parachute, it is necessary to provide a substantial number of riser lines between the flexible wing and the control platform so that the aerodynamic loads are uniformly distributed on the sail. In a deployment sequence as illustrated herein, a substantially smaller number of riser lines are needed than would be required for a fully limp wing.

Obviously many modifications and variations of the present invention are possible in light of the above teachings. It is therefore to be understood that within the scope of the appended claims the invention may be practiced otherwise than as specifically described.

What is claimed is:

1. A method of packing a flexible wing having first and second flexible inflatable leading edge booms and a flexible inflatable keel boom therebetween, said three booms being interconnected at one end thereof and diverging in a crowfoot shape, and a flexible sail between said booms comprising:
   folding the flexible wing along the keel boom so that the first and second leading edge booms are together along their length at substantially their maximum angular separation from said keel boom; and
   folding the flexible wing in a number of folds transverse to the keel boom in a compact bundle.

2. A method as defined in claim 1 further comprising the steps of: enclosing the folded flexible wing in a flexible bag; and folding the flexible bag containing the flexible wing into a compartment.

3. A method of deploying a flexible wing from which a payload is suspended by a plurality of flexible lines, wherein said wing is in an initially folded condition, and wherein said flexible wing comprises first and second flexible inflatable leading edge booms and a flexible inflatable keel boom therebetween, said booms being interconnected at one end thereof and diverging in a crowfoot shape, and a flexible sail between said booms comprising:
   releasing said folded wing;
   substantially simultaneously commencing inflation of said keel boom; and
   sequentially later inflating said leading edge booms.

4. The method of claim 3 wherein the steps of inflation comprise:
   feeding fluid from a fluid source into the keel boom; and
   feeding fluid from the keel boom into the leading edge booms at a restricted rate.

5. A method of deploying as defined in claim 3 further comprising the steps of:
   temporarily restraining at least a portion of the keel boom at a first distance from said payload;
   simultaneously temporarily restraining an aft portion of said wing at a second distance from said payload;
   simultaneously temporarily releasing other portions of said wing to assume positions determined at least in part by inflation of the inflatable portion of said wing; and wherein
   said temporary conditions continue at least until inflation of the inflatable portion of said wing is completed.

6. A method of packing and deploying a flexible wing vehicle comprising a payload supporting member including a packing volume, a flexible wing, and a plurality of riser lines interconnecting said wing and said payload supporting member; said wing comprising first and second elongated flexible inflatable leading edge booms, an elongated flexible inflatable keel boom between said leading edge booms, said booms being interconnected at one end thereof and diverging in a crowfoot shape when deployed, and a flexible sail between said booms; said riser lines comprising a plurality of keel riser lines attached to said wing at intermittent spaces along said keel boom and a plurality of leading edge riser lines attached to said wing at intermittent spaces along said leading edge booms; comprising the steps of:
   folding said wing along the keel boom so that the first and second leading edge booms are together along their length at substantially their maximum angular separation from said keel boom;
   folding said wing in a plurality of accordion folds transverse to said keel boom so that inflation of said keel boom unfolds said wing;
   packing said wing in the packing volume;
   releasing said wing from the packing volume; and
   substantially simultaneously with said releasing step commencing inflation of said keel boom.

7. A method of packing and deploying a flexible wing vehicle comprising a payload supporting member including a packing volume, a flexible wing, and a plurality of riser lines interconnecting said wing and said payload supporting member; said wing comprising first and second elongated flexible inflatable leading edge booms, an elongated flexible inflatable keel boom between said leading edge booms, said booms being interconnected at one end thereof and diverging in a crowfoot shape when deployed, and a flexible sail between said booms; said riser lines comprising a plurality of keel riser lines attached to said wing at intermittent spaces along said keel boom and a plurality of leading edge riser lines attached to said wing at intermittent spaces along said leading edge booms; comprising the steps of:
   packing said wing in the packing volume;
   releasing said wing from the packing volume;
   substantially simultaneously with said releasing step commencing inflation of said keel boom; and
   limiting gas flow to said leading edge booms so that said leading edge booms inflate later than said keel boom.

8. A method of packing and deploying as defined in claim 7 further comprising the steps of:
temporarily restraining said keel boom at a first distance from said payload by means of said keel riser lines; and
substantially simultaneously temporarily restraining the aft ends of said leading edge booms at a second distance from said payload.

9. A method of packing and deploying a flexible wing vehicle comprising a payload supporting member including a packing volume, a flexible wing, and a plurality of riser lines interconnecting said wing and said payload supporting member; said wing comprising first and second elongated flexible inflatable leading edge booms, an elongated flexible inflatable keel boom between said leading edge booms, said booms being interconnected at one end thereof and diverging in a crowfoot shape when deployed, and a flexible sail between said booms; said riser lines comprising a plurality of keel riser lines attached to said wing at intermittent spaces along said keel boom and a plurality of leading edge riser lines attached to said wing at intermittent spaces along said leading edge booms; comprising the steps of:
packing said wing in the packing volume;
releasing said wing from the packing volume;
substantially simultaneously with said releasing step commencing inflation of said keel boom;
temporarily restraining said keel boom at a first relatively greater distance from said payload by means of said keel riser lines; and
substantially simultaneously temporarily restraining the aft ends of said leading edge booms at a second relatively smaller distance from said payload.

10. A method of packing and deploying as defined in claim 9 further comprising the steps of:
continuing inflation of said keel boom during at least part of said temporarily restraining step; and
inflating said leading edge booms.

11. A method of packing and deploying as defined in claim 10 further comprising the step of:
substantially simultaneously releasing the temporary restraint on the forward part of said keel boom and on the aft ends of said leading edge booms so that said inflated booms pop into a deployed position.

12. A flexible wing vehicle and deployment means therefore comprising:
a completely foldable triangular wing of flexible material having leading edge portions and a central portion;
a plurality of riser lines attached to said wing for connection to a payload;
means for reefing aft corners of said leading edge portions below said central portion to form an M-shaped transverse cross-section bonnet-like shape in said wing;
means for rigidifying portions of said wing; and
means for dereefing the aft corners of said leading edge portions for fully extending said wing.

13. A flexible wing vehicle as defined in claim 12 wherein said means for rigidifying comprises inflation means for inflating one portion of said wing and sequentially later inflating another portion of said wing.

14. A flexible wing vehicle as defined in claim 12 wherein said wing comprises:
a rigidifiable keel boom at said central portion;
first and second rigidifiable leading edge booms attached to said keel boom at the leading end of said wing and diverging therefrom in a crowfoot shape along said leading edge portions; and
a flexible sail between said keel boom and said leading edge booms; and wherein
said reefing means temporarily holds the aft ends of said leading edge booms in close proximity to a payload.

15. A flexible wing vehicle as defined in claim 14 wherein said means for rigidifying comprises:
means for inflating said keel boom;
means for limiting gas flow from said keel boom to said leading edge booms so that said leading edge booms are inflated later than said keel boom.

16. A flexible wing vehicle as defined in claim 15 wherein said means for limiting comprises a gas manifold at the leading end apex of said wing and said gas manifold includes a flow limiting passage.

17. A flexible wing vehicle as defined in claim 16 wherein said gas manifold comprises:
a first tube communicating with the interior of one of said leading edge booms;
a second tube communicating with the interior of the other of said leading edge booms;
a third tube communicating with the interior of said keel boom, said third tube including said flow limiting passage;
a T connection on said third tube; and
flexible tubing connecting said T connection and said first and second tubes.

18. A flexible wing vehicle as defined in claim 16 wherein said plurality of riser lines includes:
a plurality of leading edge riser lines attached to said wing adjacent said leading edge booms; and
a plurality of keel riser lines attached to said wing adjacent said keel boom; and further comprising:
means for temporarily reefing the forward keel riser; and
means for dereefing the forward keel riser line.

19. A flexible wing vehicle as defined in claim 18 wherein said means for dereefing the aft corners of said wing and said means for dereefing the forward keel riser line are mechanically interconnected for reliable operation.

References Cited

UNITED STATES PATENTS

| | | | |
|---|---|---|---|
| 3,141,640 | 7/1964 | Sutliff et al. | 244—138 |
| 3,198,458 | 8/1965 | Fink | 244—49 |
| 3,212,730 | 10/1965 | Tschudy et al. | 244—1 |
| 3,275,271 | 9/1966 | Forehand | 244—138 |
| 3,310,261 | 3/1967 | Rogallo | 244—44 |

OTHER REFERENCES

Aviation Week & Space Tech., Jan. 27, 1964, cover page and p. 89.

FERGUS S. MIDDLETON, *Primary Examiner.*

B. BELKIN, *Assistant Examiner.*